United States Patent Office 3,474,036
Patented Oct. 21, 1969

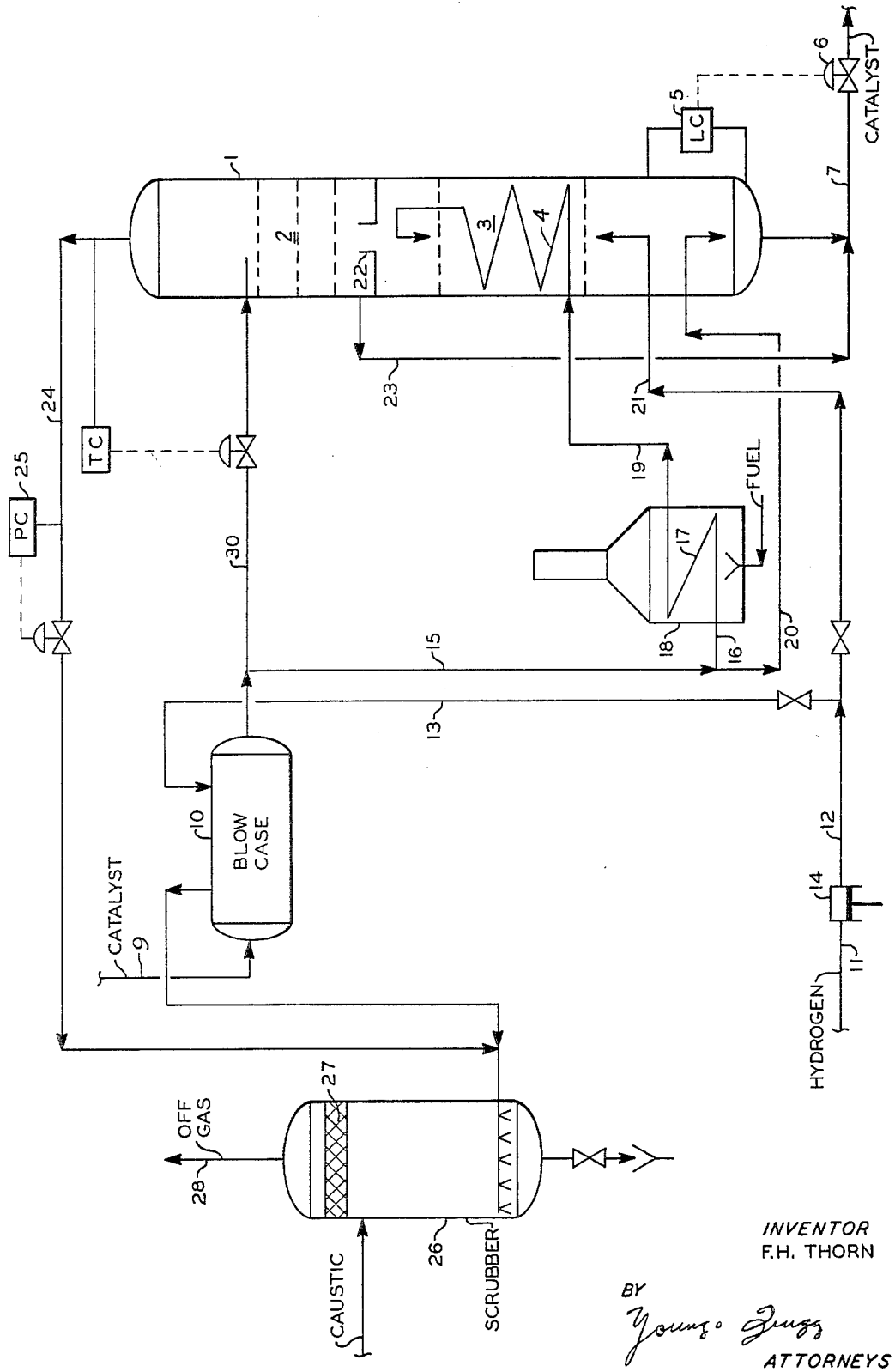

3,474,036
REGENERATING CATALYST EMPLOYING INDIRECT HEAT EXCHANGE IN COMBINATION REACTOR-ABSORBER STRIPPER OPERATION
Frank H. Thorn, Bartlesville, Okla., assignor to Phillips Petroleum Company, a corporation of Delaware
Filed July 11, 1966, Ser. No. 564,316
Int. Cl. B01j 11/02
U.S. Cl. 252—411　　　　　　　　　　　　　　　10 Claims

ABSTRACT OF THE DISCLOSURE

A spent catalyst is regenerated by preheating the same and introducing it into indirect heat exchange contact with a portion of catalyst already undergoing regeneration in a reactor section of a regeneration zone. The zone comprises an absorber section, a trap-out section, a reactor section, and a bottom section. Preheated catalyst is passed through a heat exchanger located within the reactor section and discharged into said reactor section. Another portion of catalyst is passed to an upper portion of the absorber section and passes downwardly into the trap-out section from which at least a portion of catalyst now contacted with vapors rising from the reactor section is removed as for reuse. Catalyst from the reactor section having been largely regenerated is collected in the bottom section of the zone and removed for reuse together with a further portion of catalyst which can be introduced into said bottoms section to cool or quench regenerated catalyst. A gas such as hydrogen is used for removing catalyst and at least a portion thereof can be introduced to the regeneration zone, for example, to the foot of the reactor section, to act as a regeneration gas and to assist in stripping vapors from the catalyst undergoing regeneration.

This invention relates to regeneration of a spent catalyst. More particularly it relates to regeneration of a fluid, but sludge-like catalyst, for example, aluminum chloride catalyst as used in certain operations, for example alkylation, e.g., production of diisopropyl by reaction of isobutane and ethylene, or in isomerization, as in the isomerization of butane to isobutane.

In one of its concepts the invention relates to a method for regenerating a spent catalyst in which the catalyst is heated and subjected to the action of hydrogen during its regeneration, the regeneration being conducted in a zone to which the catalyst is fed in several portions, a portion being fed to the top of the zone as absorption liquid for contacting upflowing vapors resulting from catalyst undergoing regeneration in a lower or mid-section of said zone, a portion which is heated and fed to the mid-section of said zone wherein catalyst is regenerated, and a portion which is fed as quench medium to the bottom of said zone. In another of its concepts, the invention relates to the passing of heated catalyst portion into indirect heat exchange with catalyst being regenerated and then discharging the thus-used portion into the mass of catalyst being regenerated, preferably into the top or at the top or level of surface thereof. In a further concept of the invention, the hydrogen for regeneration purposes is introduced into said zone at or near the bottom of the regeneration section and passed upwardly therethrough into contact with the catalyst undergoing regeneration and catalyst portion introduced into the top of said zone. In a still further concept of the invention, a gas contacted portion of the catalyst introduced into the top of said zone is recovered therefrom as for reuse, for example, together with regenerated catalyst removed from the bottom of said zone along with catalyst added as quench. In a futher concept of the invention, a catalyst is supplied from a storage zone under pressure of hydrogen to each of the sections of said zone as described herein.

The use of catalysts such as aluminum halide catalyst, e.g., aluminum chloride-hydrocarbon complex catalyst, in connection with which the invention will now be described, is well known. Such catalysts have been used either alone or in the presence of added promoters, for example hydrogen halides, organic halides, etc., for the conversion of hydrocarbons. For example, aluminum chloride is known to promote cracking of hydrocarbons, the alkylation of hydrocarbons, the isomerization, the polymerization and other reactions of hydrocarbons.

It is also known that during use the aluminum chloride complex catalyst becomes sludge-like in character if it has not already been prepared as such. This complex or sludge material which is catalytic in character is separated from the reaction products and at least a portion of the same is passed to regeneration before reuse. For example, in the production of diisopropyl, catalyst complex from a settler is passed in part to a regeneration before it is reused.

Some patents which are more-or-less related to the use of, or to the regeneration of, aluminum halide conversion catalysts are 2,416,049, Feb. 18, 1947, A. L. Foster; and 2,525,830, Oct. 17, 1950, H. R. Sailors and H. J. Hepp.

It is known that aluminum chloride sludge or complex can be reactivated by admixture with hydrogen at elevated temperatures, for example at temperatures of from about 200 to about 500° F. or higher, and under pressures which may be atmospheric, but which peferably will range from about 550 to about 5500 or 6000 p.s.i., the pressure being supplied essentially by hydrogen. The preceise conditions under which aluminum chloride catalysts can be regenerated are recently well known in the art and do not form a part of the present invention.

It is known to introduce the catalyst to be regenerated into the top of a regenerating chamber provided with a heating element extending substantially throughout the chamber, and to pass the catalyst under regenerating conditions of temperature and pressure downwardly in indirect contact with the heating element into countercurrent contact with heated hydrogen at, say, a temperature in the range of from about 300 to about 1000° F. and at a pressure up to about 1000 p.s.i. Before introducing the hydrogen into the regeneration chamber the hydrogen or hydrogen-containing gas is passed through a preheater so that the desired regeneration temperature may be attained.

It is also known to introduce sludge catalyst into the top of a hydrogenation reactor or regeneration zone, and to pass it downwardly through a stripping absorption zone to strip free hydrocarbon from the sludge and absorb vaporous salts from the effluent gas and passing the sludge downwardly into a reaction section at the bottom of the hydrogenation regeneration zone. A part of the sludge can be passed to a heater or heat exchanger and then passed into the hydrogenation reactor or regeneration zone below the stripping-absorption zone. Hydrogen gas is introduced into the bottom of the reaction or regeneration zone.

I have now conceived of an improved modus operandi and reaction or regeneration zone or apparatus in which the catalyst to be regenerated is at least in part preheated and passed into indirect countercurrent flow contact with catalyst passing downwardly in the regeneration zone and wherein the thus preheated and countercurrently contacted catalyst is then discharged into the said zone. I have also conceived that a portion of the catalyst to be regenerated should be passed or can be passed to the top of the zone into an absorber section as absorption liquid following which it, together with absorbed material, is trapped out a least in part and returned for reuse without any further regeneration or retreatment. Still further, I have conceived that there can be passed at least a portion of the catalyst to be regenerated to the bottom of the reaction or regeneration zone, thereby to provide some temperature control or quench as well as level in the operation of the bottom of the said zone, and other advantages as are apparent from a study of this disclosure. The hydrogen is introduced below the mix section or heat exchange section of the zone as will appear in more detail below and above the liquid level in the bottom of said zone. Still further, I have conceived that at least a portion of the hydrogen can be used to propel any one or more or all of the portions of catalyst which are introduced into various sections of the regeneration zone.

It is an object of this invention to provide a process for the regeneration of a catalyst. It is another object of this invention to provide for the regeneration of a catalyst complex or sludge wherein catalyst oils are converted to lighter, lower boiling materials by hydrogenative-cracking. It is a further object of the invention to provide for the regeneration of an aluminum chloride catalyst or sludge. It is a still further object of this invention to provide for the regeneration of an aluminum chloride-hydrocarbon complex catalyst or sludge. It is a still further object of the invention to provide a combination of steps, conditions, and zones in which to effectively regenerate a catalyst under flexibly controllable conditions. It is a still further object of the invention to provide an apparatus for the regeneration of a catalyst.

Other concepts, objects and the several advantages of the invention are apparent from a study of this disclosure, the drawing and the appended claims.

According to the present invention, there is provided a method for regenerating a catalyst such as an aluminum chloride-hydrocarbon complex catalyst or sludge which comprises regenerating a portion of such a catalyst at a temperature and other conditions required in a zone for this purpose, including conversion of catalyst oils into volatile materials, introducing to the top of the zone into an absorber section at least a portion of such catalyst for countercurrent contact with vapors rising through said zone, introducing a regeneration gas such as hydrogen or hydrogen-rich gas into intimate contact with catalyst undergoing regeneration in said zone, and withdrawing from above a body of catalyst undergoing regeneration in said zone, at least a part of said portion of catalyst which has been introduced into said absorber section.

Still further according to the invention at least a portion of the catalyst is passed to the bottom of the regeneration zone as quench medium, wherein a liquid level is maintained.

Still further according to the invention, the catalyst portions can be propelled to their respective places employing regenerating gas or hydrogen gas pressure as from a common blow case.

Referring now to the drawing, there is provided a regeneration zone having an absorber section and a reactor section, respectively identified as 1, 2 and 3. Reactor section 3 is equipped with coil 4 and is packed with contact material such as carbon Raschig rings, properly retained on a porous support means. The regeneration is provided with a liquid level control 5 operating upon valve 6 located in draw-off pipe 7.

In operation, a batch of catalyst complex from a settler as in a diisopropyl production unit in connection with which the invention is now being described, is passed via conduit 9 to blow case 10 to which is supplied hydrogen by means of pipes 11, 12 and 13, and compressor 14. Under the pressure of the hydrogen, the batch of catalyst is passed by pipe 30 into the top of the regenerator or tower 1 and discharged immediately above absorber section 2. This section can contain trays, for example, cartridge sieve trays, to provide good contact between rising vapors or gases and downwardly moving liquid catalyst which has been introduced. At least a portion of the catalyst is passed by 15 and 16, through coil 17 in heater 18, and by 19 into coil 4 in section 3 of regenerator 1. The preheated catalyst is discharged from the end of coil 4 into the reactor section 3. A further portion of the catalyst complex is passed as quench liquid by 20 into the bottom of regenerator 1. Further hydrogen is passed into the bottom of the regenerator by pipe 21. The pressure in this specific example is approximately 1050 p.s.i.a. The temperature of the catalyst in blow case is 125° F., and after preheat in coil 17 is about 450 to 500° F. The distribution of the catalyst in the embodiment being described is approximately 65 barrels per day into the top, 113 barrels per day into the reactor section and 66 barrels per day into the bottom of the regenerator 1. Hydrogen passed into the regenerator system totals approximately 363,000 standard cubic feet per day of which 276,000 standard cubic feet per day passed to the bottom section of the regenerator 1. The remainder of the hydrogen passes by 13 into blow case 10. Some of this hydrogen passes, together with the catalyst, into the respective sections of the regenerator. However, some of the hydrogen also passes together with vapors from the blow case, as will appear below.

Catalyst which is passed downwardly through the absorber section is at least in part trapped out at trap-out tray 22 and passed by 23 into 7 and from the regeneration back to the catalyst settler of the diisopropyl production unit. Any overflow from trap-out tray 22 will pass downwardly through the reactor section together with preheated catalyst introduced through coil 4. In the absorber section, the catalyst introduced by pipe 30 will absorb any upwardly passing catalyst. The temperature in the reactor section is maintained at approximately 435° F. Overhead gases and any vapor are taken from regenerator 1 by way of 24 equipped with pressure controller control valve 25 to caustic treater or scrubber 26. There is also passed to this scrubber overhead gases removed from the blow case. In the caustic scrubber, the gases are treated with a solution of sodium hydroxide of approximately 15 percent concentration. The treated gases are passed upwardly through a mist extractor 27 and from the unit by 28.

SPECIFIC EXAMPLE

Operating conditions—
    Caustic scrubber (26):
        Pressure, p.s.i.a. _____ 115
        Temperature, ° F. _____ 100
    Regenerator (1):
        Pressure, p.s.i.a. _____ 1000
        Temperatures, ° F.:
            Absorber section _____ 150
            Reactor section _____ 435
            Quench section _____ 200

SPECIFIC EXAMPLE.—(POUNDS PER DAY)

|  | Feed to Regenerator (19)[a] | Feed to Absorber (30)[a] | Feed to Quench (20)[a] | Hydrogen to Blow Case (13) | Hydrogen to Reactor (21) | Overhead Vapor (24) | Off-Gas (28) | Catalyst Product (7) |
|---|---|---|---|---|---|---|---|---|
| Stream Component: | | | | | | | | |
| Hydrogen | | | | 439 | 1,386 | 317 | 756 | |
| Methane | | | | 33 | 105 | 2,665 | 2,698 | |
| Ethane | | | | 118 | 371 | 4,279 | 4,397 | |
| Propane | | | | 172 | 544 | 6,527 | 6,699 | |
| Butanes | | | | 120 | 380 | 3,034 | 3,154 | |
| Pentanes plus | | | | 33 | 105 | 819 | 852 | |
| Catalyst oil | 21,380 | 12,281 | 12,550 | | | | | 32,409 |
| AlCl₃ | 26,817 | 15,404 | 15,741 | | | 800 | | 57,162 |
| Al(OH)₃[b] | 486 | 279 | 285 | | | | | 1,050 |
| FeCl₂[c] | 75 | 43 | 44 | | | | | 162 |
| Total | 48,758 | 28,007 | 28,620 | 915 | 2,891 | 18,441 | 18,556 | 89,783 |
| Wt. percent Catalyst Oil[d] | 43.9 | 43.9 | 43.9 | | | | | 35.0 |
| Gal./day | 4,757 | 2,732 | 2,792 | | | | | 7,995 |
| M.s.c.f.d.[e] | | | | 87 | 275 | 259 | 344 | |

[a] Thousands Standard Cubic Feet/Day.
[b] Al(OH)₃ is formed by water in the hydrocarbon feed.
[c] FeCl₃ is converted to FeCl₂ in the diisopropyl reactor.
[d] Reduction in catalyst oil from 43.9 weight percent to 35.0 weight percent.
[e] Does not include absorbed hydrogen-rich gases.

Reasonable variation and modification are possible within the scope of the foregoing disclosure, the drawing and the appended claims to the invention, the essence of which is that there have been provided a method and apparatus suitable for the regeneration of a catalyst such as an aluminum chloride-hydrocarbon complex catalyst or sludge, the catalyst being introduced in several portions into a combination absorber-reactor-regeneration zone, a portion being introduced into the top for countercurrent contact with vapors or gases rising from a regeneration or reactor section, wherein the catalyst is being regenerated by reaction in the presence of hydrogen at elevated temperature and pressure, the introduced portion passing through the absorber section is at least in part removed, prior to passing to the reactor section, and suitably reused, the portion introduced to the reactor section is preheated and passed into preferably countercurrent heat exchange with downwardly flowing catalyst under regeneration in the reactor section, hydrogen is introduced to below the reactor section, and another portion of the catalyst is introduced into the bottom of the regeneration zone; the various portions of catalyst in at least one embodiment being propelled under hydrogen pressure from a source of catalyst to be regenerated.

I claim:

1. In a method for regenerating a spent aluminum chloride-hydrocarbon complex catalyst the improvement which comprises preheating the same and introducing the same into indirect heat exchange contact with a portion of said catalyst undergoing regeneration in a reactor section disposed at an intermediate portion of a regeneration zone thereby causing said spent catalyst to be heated and regenerated to an extent and to be heated for further regeneration in said reactor section following on said indirect heat exchange contact.

2. A method according to claim 1 wherein there is provided an absorber section above said reactor section and there is introduced substantially into an upper portion of said absorber section at least a portion of said catalyst, and wherein there is provided above said reactor section, but below said absorber section, a collecting and trap-out zone to remove a substantial portion of the catalyst which has been introduced to the upper portion of the said absorber section.

3. A method according to claim 1 wherein there is introduced below said reactor section at least a portion of said catalyst to be regenerated.

4. A method according to claim 1 wherein there is introduced and passed through an absorber section located above said reactor section at least a portion of said catalyst which then is removed before it enters into said reactor section, and wherein there is introduced below said reactor section at least another portion of said catalyst.

5. A method according to claim 1 wherein a regenerating gas suitable for regenerating said catalyst is passed through said reactor section.

6. A method according to claim 4 wherein a gas suitable for regenerating said catalyst is introduced into a bottom portion of said regeneration zone below said reactor section.

7. A method according to claim 4 wherein hydrogen is introduced into a bottom portion of said regeneration zone below said reactor section.

8. An apparatus for regenerating a spent catalyst in a manner described comprising a reactor-absorber means, said means having disposed therein in its upper portion an absorber section, said means having disposed therein below said absorber section, but above the bottom of said means, a reactor section, said means having disposed intermediate said absorber section and said reactor section liquid collecting and removal means for collecting liquid passing downwardly from said absorber section, said reactor section having a heating fluid conveying means adapted to effect heating of said reactor section by indirect heat exchange therein, then discharge heating fluid from said heating means into said reactor section, said reactor-absorber means having means for removing vapors from the top thereof, means for introducing a fluid into a top portion of said absorber section below said means for removing vapors, means for introducing a vapor or fluid to a bottom portion of said reactor section, and means for removing a liquid from the bottom of said reactor-absorber means.

9. An apparatus according to claim 8 wherein a reactor-absorber feed vessel adapted to contain liquid feed is provided in combination with said reactor-absorber means, means are provided for feeding a pressurizing fluid into said vessel above liquid level content therein, means are provided in communication with said vessel and said reactor-absorber means for feeding fluid to a top portion of said absorber section, and heating means are provided communicating with said vessel and with said heating fluid conveying means to supply heat from said heating means to said heating fluid conveying means.

10. An apparatus according to claim 9 wherein said heating fluid conveying means is disposed in said reactor section in a manner to effect overall upflow of the heating fluid in countercurrent heat exchange of the heating fluid with downflowing contents of said reactor section prior to discharging the fluid from said heating fluid conveying

| | | | |
|---|---|---|---|
| 2,403,107 | 7/1946 | McAllister | 260—683.5 |
| 2,873,248 | 2/1959 | Tate | 208—136 |
| 3,210,292 | 10/1965 | Evans | 252—411 |

PATRICK P. GARVIN, Primary Examiner

U.S. Cl. X.R.

23—288 means into said reactor section, said heating fluid conveying means terminating at a locus which is at the upper portion of said reactor section.

References Cited

UNITED STATES PATENTS 2,421,524  6/1947  Ross _____ 260—683.5